United States Patent
McEwan

(10) Patent No.: US 6,373,428 B1
(45) Date of Patent: Apr. 16, 2002

(54) SELF LOCKING DUAL FREQUENCY CLOCK SYSTEM

(75) Inventor: Thomas E. McEwan, Carmel Highlands, CA (US)

(73) Assignee: McEwan Technologies, LLC, Pleasanton, CA (US)

( * ) Notice: Subject to any disclaimer, the term of this patent is extended or adjusted under 35 U.S.C. 154(b) by 0 days.

(21) Appl. No.: 09/282,947

(22) Filed: Apr. 1, 1999

(51) Int. Cl.[7] .......................... G01S 13/00; G01S 13/08; G01S 7/28
(52) U.S. Cl. .......................... 342/175; 342/21; 342/70; 342/82; 342/89; 342/118; 342/124; 342/134; 331/46
(58) Field of Search .................. 342/82–103, 173–175, 342/200–205, 21, 109, 118–135, 70, 71, 73, 195; 331/2, 18, 46, 47, 1 A, 22; 455/74, 76, 230, 255, 257–260

(56) References Cited

U.S. PATENT DOCUMENTS

| | | | | |
|---|---|---|---|---|
| 2,245,627 A | * | 6/1941 | Varian | 331/2 |
| 2,864,956 A | * | 12/1958 | Makow | 331/22 |
| 3,944,925 A | * | 3/1976 | De Laune | 455/76 |
| 4,000,466 A | | 12/1976 | Scouten et al. | |
| 4,002,995 A | * | 1/1977 | Reed | 331/1 A |
| 4,042,884 A | | 8/1977 | Querry | |
| 4,118,673 A | * | 10/1978 | Hafner | 331/2 |
| 4,132,991 A | * | 1/1979 | Wocher et al. | 342/134 |
| 4,251,777 A | | 2/1981 | Sartorius et al. | |
| 4,322,832 A | | 3/1982 | Sartorius | |
| 4,435,847 A | * | 3/1984 | Williamson et al. | 455/260 |
| 4,677,395 A | | 6/1987 | Baker | |
| 4,974,236 A | | 11/1990 | Gurcan et al. | |
| 5,260,670 A | | 11/1993 | Ainsworth et al. | |
| 5,343,168 A | | 8/1994 | Guthrie | |
| 5,963,163 A | * | 10/1999 | Kemkemian et al. | 342/109 |
| 6,072,427 A | * | 6/2000 | McEwan | 342/175 |

* cited by examiner

*Primary Examiner*—Bernarr E. Gregory
(74) *Attorney, Agent, or Firm*—Mark A. Haynes; Haynes Beffel & Wolfeld LLP

(57) ABSTRACT

Two crystal oscillators are configured as a "plug-and-play" precision transmit-receive clock system that requires no calibration during manufacture. A first crystal oscillator generates a transmit clock and a second crystal oscillator generates a receive clock that operates at a small offset frequency Δ from the transmit clock. A frequency locked loop regulates Δ by regulating the frequency of the detected receive pulses from a radio, radar, laser, ultrasonic, or TDR system. The clock system further includes a wrong sideband reset circuit and a phase lock injection port. Applications include a timing system for automotive backup and collision warning radars, precision radar and laser rangefinders for fluid level sensing and robotics, precision radiolocation systems, and universal object/obstacle detection and ranging.

19 Claims, 4 Drawing Sheets

SELF LOCKING DUAL FREQUENCY CLOCK SYSTEM

BACKGROUND OF THE INVENTION

1. Field of the Invention

The present invention relates to timing circuits, and more particularly to precision swept delay circuits. A particular application is to radar timing circuits, including precision swept delay circuits for equivalent time ranging systems. It can be used to generate a swept-delay clock for sampling-type radar, laser and TDR systems, as well as radio and ultrasonic systems.

2. Description of Related Art

High-resolution pulse-echo systems such as wideband pulsed radar, pulsed laser rangefinders, and time domain reflectometers (TDR) generally sweep a timing circuit across a range of delays. The timing circuit controls a receiver sampling gate such that when an bill echo signal coincides with the temporal location of the sampling gate, a sampled echo signal is obtained. The echo range is then determined from the timing circuit, so highly accurate swept timing is needed to obtain accurate range measurements.

Prior art approaches to swept timing include analog methods and systems: (1) an analog voltage ramp that drives a comparator, with the comparator reference voltage controlling the delay, or (2) a delay locked loop (DLL), wherein the delay between a transmit and receive g clock is measured and controlled with a phase comparator and control loop. Both approaches are subject to component and temperature variations, and are generally limited to an accuracy of 0.01 to 1 percent of full scale. Examples of DLL architectures are disclosed in U.S. Pat. No. 5,563,605, "Precision Digital Pulse Phase Generator" by McEwan, and in copending application, "Phase-Comparator-Less Delay Locked Loop", filed May 26, 1998, Ser. No. 09/084,541, by McEwan, now U.S. Pat. No. 6,055,287.

A potentially more accurate approach uses two oscillators with frequencies $F_T$ and $F_R$ that are offset by a small amount $F_T-F_R=\Delta$. In a radar application, a first oscillator of frequency $F_T$ triggers transmit RF pulses, and a second oscillator of frequency $F_R$ triggers a short sampling gate for the echo RF pulses. Due to the small frequency difference $\Delta$, the timing of the sampling gate smoothly and linearly slips in phase (i.e., time) relative to the transmit clock such that one full cycle is slipped every $1/\Delta$ seconds. The two frequencies are directly measured and used to control $\Delta$.

The slow phase slip creates a time expansion effect of $F_T/\Delta$ (~100,000 typically). Thanks to the expansion effect, events on a picosecond scale are converted to an easily measurable microsecond scale. In contrast, a real time counter would need a teraHertz clock to measure with picosecond resolution, well beyond present technology.

This two-oscillator technique was used in the 1960's in precision time-interval counters with sub-nanosecond resolution, and appeared in a short-range radar in U.S. Pat. No. 4,132,991, "Method and Apparatus Utilizing Time-Expanded Pulse Sequences for Distance Measurement in a Radar," issued in 1979 to Wocher et al.

The accuracy of the two-oscillator technique is limited by the accuracy of the clocks, which can be extremely accurate, and by the smoothness, or linearity in phase vs. time, of the phase slip between them. Nothing appears in the prior art to support the linearity of the phase slip—it is not easy to measure, and it is also easy to assume it is somehow perfect. Unfortunately, there are many influences that can affect the smoothness of the phase slip that are addressed by the present invention. These include digital cross-talk that can produce 100 ps of error or more, and offset frequency control circuit aberrations than can introduce even more substantial phase slip nonlinearities.

SUMMARY OF THE INVENTION

The present invention is a precise clock system for pulsed radio, radar, laser, ultrasonic, and TDR ranging systems (and other timing applications which need an offset frequency) requiring high stability and accuracy, and a transmitter-receiver system incorporating the clock system. The clock system generates a first clock signal to drive a transmitter and a second clock signal to drive a sampling-type receiver. The present invention is a two oscillator timing system having a first oscillator to provide the first clock signal and a second oscillator to provide the second clock signal. The frequencies ($F_T$, $F_R$) of the two clocks differ slightly (by $\Delta$) such that a smooth phase slip occurs between them. Thus, a replica of the echo (travelling at the speed of light for electromagnetic systems) is produced by the sampler on a slow time scale ($1/\Delta$~40 milliseconds), known as equivalent time, which directly allows high resolution (e.g., picosecond) measurements on an expanded scale. In contrast to the prior art, the frequency difference $\Delta$ between the two oscillators is not directly measured; instead, an effect arising from $\Delta$—the receive pulse rate—is measured and controlled.

Key advantages to this arrangement include (1) the first oscillator can be totally isolated from the rest of the system (except its connection to a transmitter), so error-producing crosstalk can be eliminated, (2) the first oscillator can be remotely located, such as in a radio system, (3) a simplified implementation can be realized, since a mixer and frequency divider chain is not required, and the overall embodiment is compact and of low cost.

The present invention uses a sampling-type frequency locked loop (FLL) between the receiver and the second clock to accurately control the slip rate $\Delta$, and an optional phase lock port is provided to phase lock $\Delta$ to an external reference frequency $\Delta_{REF}$. Additionally, the FLL employs a wrong-sideband detector so the FLL can reliably lock to small values of $-\Delta$ without a false lock at $+\Delta$, i.e. the FLL will ensure that the second oscillator frequency is slightly lower than $F_T$ (i.e., $F_T-\Delta$) rather than slightly higher (i.e., $F_T+\Delta$).

The present invention differs significantly from prior art timing systems based on offset oscillators in that: (1) the FLL locks to the repetition rate of detected receive pulses, (2) a sample-hold type FLL is used to eliminate phase slip nonlinearities, and (3) there is no direct connection between the transmit clock and the receive clock—offset frequency control is routed through the transmit-receive apparatus.

A primary object of the present invention is to provide a high accuracy swept timing circuit for time-of-flight ranging systems.

Yet another object of the present invention is to provide a simple "plug-and-play" timing system for highly accurate, low-cost ranging systems.

A further object of the present invention is to eliminate errors due to crosstalk and control loop aberrations.

Applications include low cost radars for security alarms, home automation and lighting control, industrial and robotic controls, automatic toilet and faucet control, automatic door openers, fluid level sensing radars, imaging radars, vehicle backup and collision warning radars, and universal object/obstacle detection and ranging. One specific embodiment utilizing the present invention is a time domain reflectometer (TDR) where a pulse is propagated along a conductor or guidewire to reflect from a material for use in a variety of applications, such as an "electronic dipstick" for fluid level sensing.

BRIEF DESCRIPTION OF THE DRAWINGS

FIG. 2b is an oscillograph of the control loop timing waveforms of the controller of FIG. 2a.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

Figure 1:
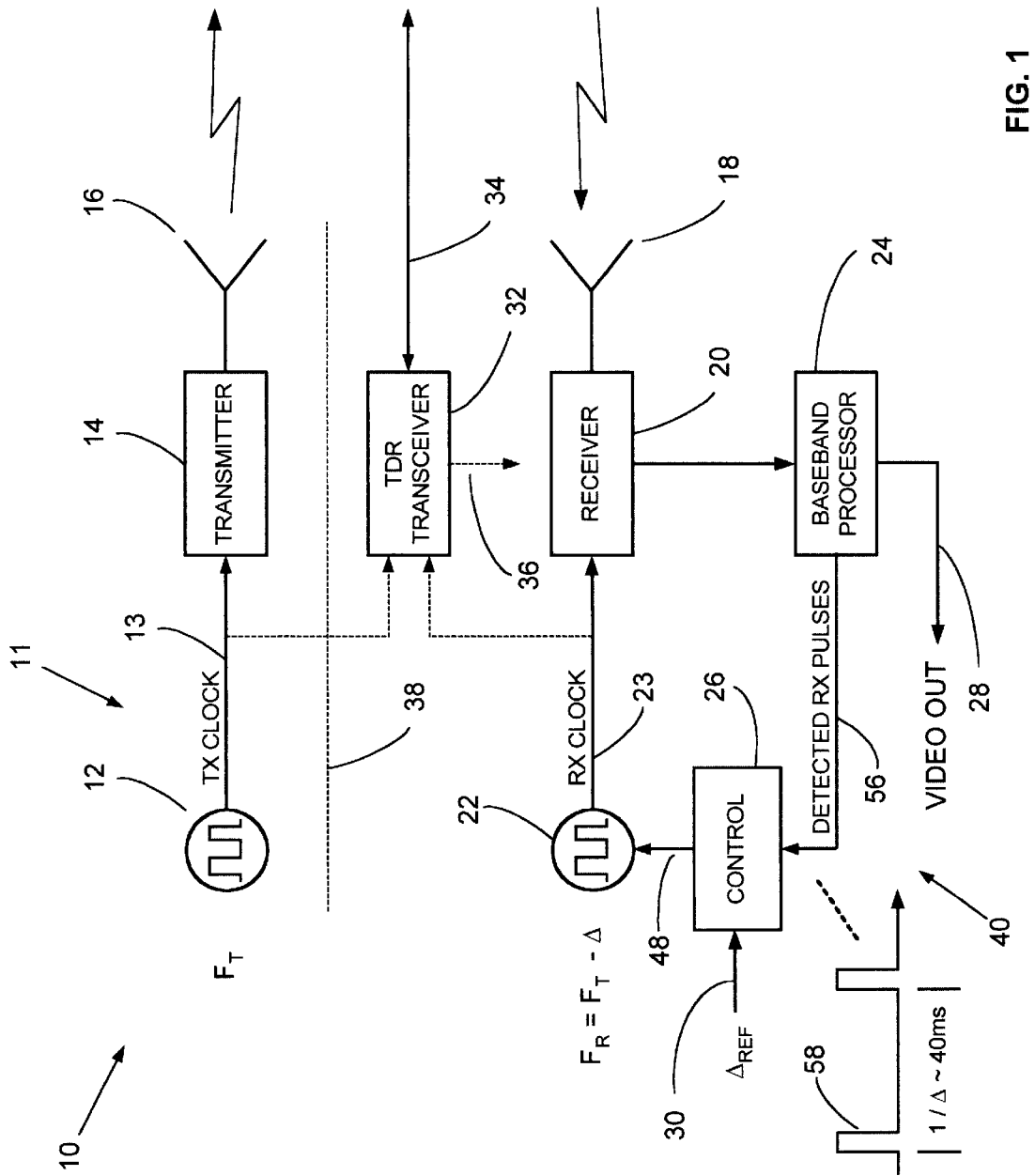
FIG. 1 is a block diagram of a pulsed transmitter-receiver or transceiver system showing a transmit (TX) and receive (RX) clock system of the present invention.

FIG. 1 shows a general pulsed transmitter-receiver or transceiver system 10 based on the timing system 11 of the present invention. A transmit oscillator 12 produces transmit clock pulses on TX CLOCK line 13 to drive a transmitter 14 which may be part of an impulse radar, a pulsed RF radar, a pulsed laser, a pulsed radio, or even a pulsed ultrasonic source. The transmitter 14 is coupled to a transducer 16 for radiation into a propagating medium. The transducer 16 may be an antenna, a laser diode and lens, or an acoustic transducer.

A receive transducer 18 receives echoes of signals generated by transducer 16 and couples electrical pulses to a receiver 20, which is a gated, sampling type receiver, such as that described in co-pending application, "Charge Transfer Wideband Sample-Hold Circuit", Ser. No. 09/084,502, by McEwan filed May 23, 1998, now U.S. Pat. No. 6,216, 126. The gate pulses to receiver 20 are obtained from receive oscillator 22 via RX CLOCK line 23, Receiver 20 outputs individual samples, or a number of integrated samples, to a baseband processor 24 which generally contains amplifiers, filters, and other elements common to equivalent time receivers, such as disclosed in copending application, "Precision Short-Range Pulse-Echo Systems With Automatic Pulse Detectors", Ser. No. 09/120, 994, by McEwan. The processor output generally includes an equivalent time analog replica of the RF, optical or acoustic echo, i.e., the VIDEO OUT signal on line 28, and digital DETECTED RX PULSES signal 58 on line 56.

Optionally, a time domain reflectometer (TDR) configuration of FIG. 1 may be utilized, wherein transmitter 14 and receiver 20 and their corresponding transducers 16, 18 are replaced with a TDR transceiver 32 with its output 36,connected to baseband processor 24. The TX CLOCK and RX CLOCK signals from oscillators 12, 22 are input to TDR transceiver 32. The TDR transceiver 32 is connected to a transmission line 34 to determine the location of discontinuities in the transmission line impedance by measuring the time delay to a reflection from the discontinuity. A common application for the TDR configuration is an "electronic dipstick" wherein the cable may be a single wire transmission line inserted into a liquid in a tank, such as a gas tank on an automobile.

One of the two oscillators 12, 22 is offset from the other by an amount D to allow for a phase slippage. Timing system 11 includes a frequency lock loop (FLL) 40 from receiver 20 and baseban processor 24 back to the receive oscillator 22. Generally, the first (transmit) oscillator 12 is set to a precise frequency FT and the second (receiver) oscillator 22 is locked to a desired offset frequency D (FR=FT−D) by a control system (offset frequency controller) 26. The control system 26 regulates the frequency of the detected receive pulses on line 56, which frequency is a direct manifestation of the frequency difference D between oscillators 12, 22. The control system applies a frequency control voltage to ascillator 22 via line 48. An optional phase lock input having a frequency Dref may applied to phase lock port 30 of control system 26 so the offset frequency D may be locked to a frequency with arbitrarily high accurancy In principle, oscillator 22 may operate at $F_T + \Delta$, but that would reverse the phase slip between the two oscillators and make the expanded-time waveforms appear time-reversed. In many systems, that would not affect performance. Throughout this description, $-\Delta$ will be used for simplicity without departing from the scope of the invention which includes $+\Delta$ operation.

High phase slip linearity requires that digital noise from the TX CLOCK be isolated from the RX CLOCK. Dashed line 38 of FIG. 1 indicates shielding to prevent unwanted TX-RX coupling. Alternatively, the transmit elements 12, 14, and 16 may be spaced away from the receive elements 18, 20, 22, 24 and 26 to form either a monostatic or bistatic transceiver or radar system, or a radio system (one-way transmission). Even in a TDR system with transceiver 32, the oscillators 12, 22 can be effectively isolated. The ability to completely isolate the transmitter and receiver is a key feature uniquely enabled by using the detected RX pulses to control the frequency offset of receive oscillator 22 relative to transmit oscillator 12—no direct connection is required between the transmitter and receiver.

Figure 2A:
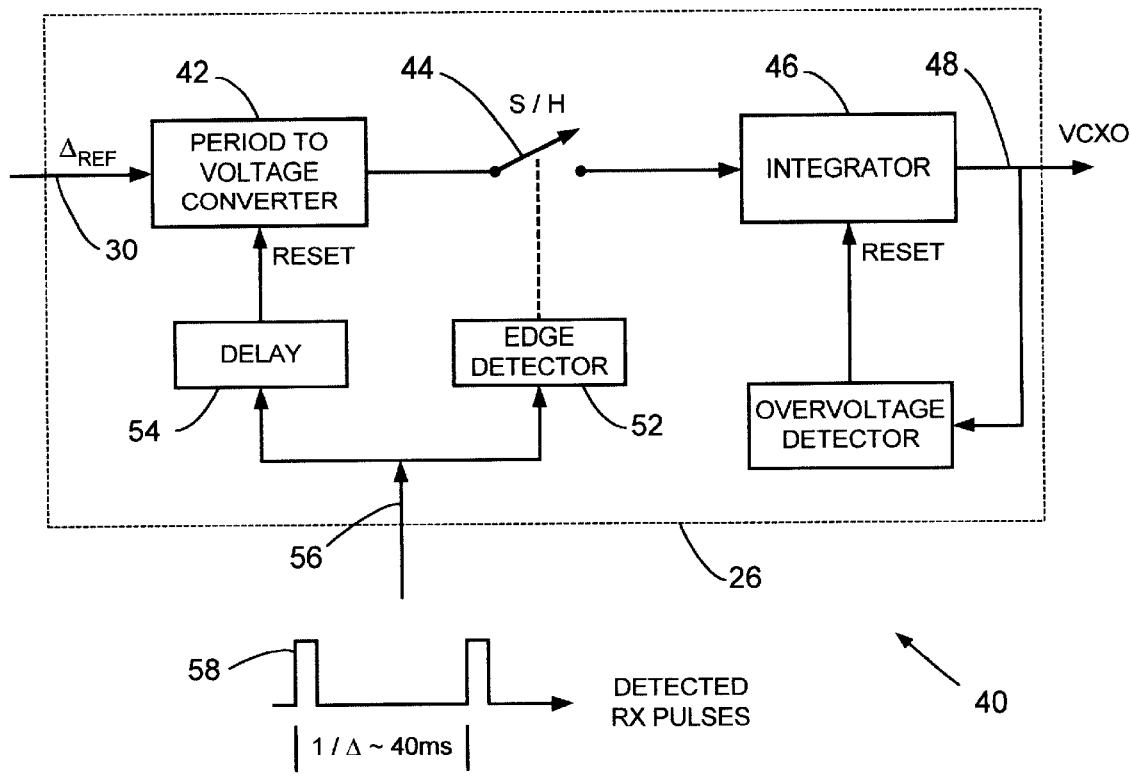
FIG. 2a is a block diagram of the frequency controller system in the clock system of FIG. 1.

FIG. 2a is an expansion of control system 26 of FIG. 1 and generally depicts the frequency locked loop (FLL) 40 of the present invention. The FLL (control system) 40 is of a sampling (or sample and hold) type, i.e., employs sampling (S/H) switch 44 and an integrating control amplifier, i.e., integrator 46, to provide an extremely low ripple, steady frequency control voltage to VCXO (Voltage Controlled Crystal Oscillator) control port (line) 48. If the control voltage were to vary during one period of $\Delta$, the instantaneous VCXO frequency would vary with a resultant non-uniformity in the phase slippage. Accordingly, the sampling architecture of the present invention eliminates this source of error.

Detected receive pulses on line 56 are split into two paths, one to edge detector 52 and the other to delay 54 which is connected to the reset input of a period-to-voltage (P-to-V) converter 42 whose output is connected through S/H switch 44 to integrator 46. Edge detector 52 controls S/H switch 44. The output of integrator 46 is the VCXO control signal on line 48, which is also input into overvoltage detector 50 which provides a wrong sideband reset signal to integrator 46 to prevent the FLL loop 40 from locking on a frequency offset on the wrong side of the transmit frequency.

Figure 2B:
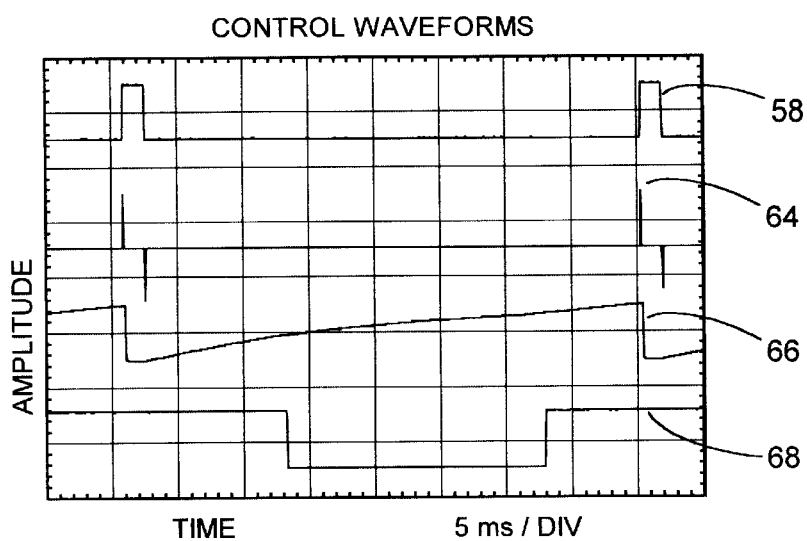

The operation of the FLL control system 40 of FIG. 2a can be understood with reference to FIG. 2b, which is an oscillograph showing the various control waveforms (voltages) of an embodiment of the present invention. The pulses of waveform 58 are the 0 to 5-volt DETECTED RX PULSES waveform 58 of FIG. 2a on line 56 from baseband processor 24. The impulses 64 are derivatives of waveform 58 produced by edge detector 52 to control sample-hold (S/H) switch 44. Exponential P-to-V (period-to-voltage) ramp waveform 66 is the output of P-to-V converter 42, and shows a reset point occurring slightly after the positive spike of waveform 64. The positive spikes cause the peak value of the P-to-V waveform 66 to be sampled and transferred to integrator 46. Shortly thereafter (after a time so short that it is barely visible in FIG. 2b), waveform 66 is reset by a slightly delayed version of the DETECTED RX PULSES waveform 58 produced by delay 54. If the period of waveform 58 were to increase, implying a reduced offset frequency $\Delta$, P-to-V waveform 66 would increase in voltage before being reset and cause an increase in voltage transferred to integrator 46 via switch 44. Consequently, oscillator 22 would change frequency to bring the system back to equilibrium.

Phase lock waveform 68 has a frequency of $\Delta_{ref}$ and is applied through phase lock port, or line, 30 to the P-to-V converter 42 so offset frequency $\Delta$ can be locked to a reference frequency $\Delta_{ref}$.

Figure 3:
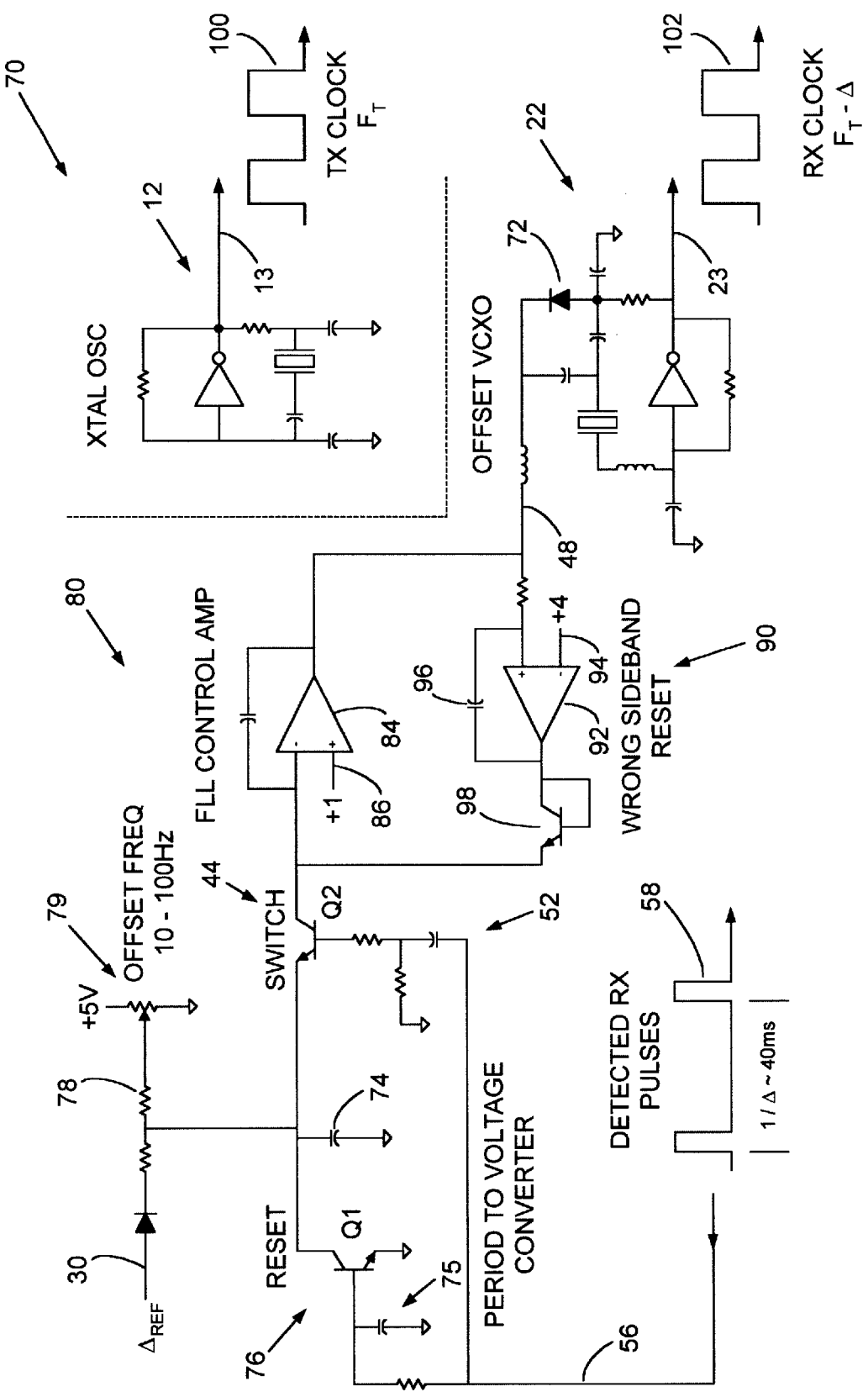
FIG. 3 is a schematic diagram of the TX and RX clock circuits, and the control circuit, of the present invention.

FIG. 3 is a detailed schematic diagram of the timing system 70 of the present invention. A first crystal oscillator 12 oscillates at a frequency $F_T$=4.000000 MHz, in this example. It is a standard CMOS configuration. Its output provides a TX CLOCK squarewave output 100 on line 13 to trigger a transmitter.

A second crystal oscillator 22, a VCXO, operates at a small offset $\Delta$, or typically 4.000000 MHz–25 Hz. Its output provides a RX CLOCK squarewave output 102 on line 23 to trigger a receiver gate. Oscillator 22 employs a diode 72 and several associated inductors and capacitors to voltage-tune its frequency via a VCXO control port on line 48.

The DETECTED RX PULSES 58 are applied to the FLL controller 80 via line 56. Pulses 58 reset the voltage on a capacitor 74 via reset circuit 76, after a short delay provided by an RC network 75. Reset circuit 76 is formed of a transistor Q1. Capacitor 74 then charges via resistor 78 to a voltage determined by the charge duration $1/\Delta$, and its voltage is then peak-sampled via switch 44 to loop control amplifier (integrator) 84. Switch 44 is formed of a transistor Q2 and is controlled by pulses provided by edge detector 52, an RC differentiation network, which is connected to line 56. Resistor 78 is connected to an adjustable voltage source 79 which can be adjusted (e.g. 0.5–5V) to select a desired $\Delta$, typically 10–100 Hz.

If the switched capacitor voltage differs from a reference voltage applied to amplifier 84 on line 86, the amplifier output will servo the VCXO 22 via line 48 until the difference frequency $\Delta$, and accordingly, the peak sampled voltage on capacitor 74 matches the amplifier's reference voltage on line 86. Hence, frequency control, or lock, is achieved.

An optional phase lock injection port is provided on line 30 which is connected to capacitor 74 through a diode D (and a resistor). Diode D is a nonlinear element. When a squarewave of frequency $\Delta_{REF}$ is applied to line 30 that is within ~10% of the equilibrium frequency of the FLL, the FLL will phase lock $\Delta$ to $\Delta_{REF}$ through an interaction mechanism stemming from the peak sampled voltage across capacitor 74, which is a function of both $\Delta$ and $\Delta_{REF}$. The phase locking mechanism works by virtue of the nonlinear, exponential nature of the voltage ramp on capacitor 74. The theory of phase locking has been dealt with extensively in the technical literature, and will not be elaborated on here.

With the FLL locking to an offset frequency at $F_T-\Delta$= 3.999975 MHz in this example, it is entirely likely that the loop may tend to lock at $F_T+\Delta$=4.000025 MHz. In reality, once the VCXO exceeds 4.000000 MHz, the FLL exhibits positive feedback and the output of control amplifier 84 goes into saturation. This condition is detected with the wrong-sideband (overvoltage) reset circuit 90. Amplifier 92 detects an overvoltage condition on VCXO control line 48 by comparing the line 48 voltage to a reference voltage on line 94. Amplifier 92 then latches-on for a duration determined by capacitor 96 (one-shot operation) and applies a reset voltage to FLL control amplifier 84 via diode-connected transistor 98. Thus, the output of amplifier 84 is forced to provide a voltage on VCXO control line 48 that is guaranteed to be on the right sideband, but perhaps not at the right frequency. Once amplifier 92 returns to its quiescent state (its output swings low), FLL control amplifier 84 servos to an equilibrium on the right sideband (i.e., at $-\Delta$ and not $+\Delta$).

Notably, the circuit of FIG. 3 achieves a precise frequency relation between its two oscillators even though there is no direct connection between them. The logic inverters (in oscillators 12, 22) in FIG. 3 are 74AC04's, the op amps 84, 92 are common CMOS types such as Toshiba TS274, and the transistors Q1, Q2, and 98 are 2N3904s.

One advantage to the use of an FLL is it can accommodate a wide initial frequency offset $\Delta$ and still achieve rapid lock. If the voltage controlled oscillator 22 can tune over a wide range, such as 100 PPM, the tolerance variations between the two crystal oscillators 12, 22 can be accommodated. Consequently, low cost crystals can be used and oscillator 22 will always achieve a frequency lock with oscillator 12 without any manual tuning during manufacture, i.e., "plug-and-play" operation can be realized.

To further clarify the tolerance requirements, quartz crystals may be specified (at low cost) with an initial error of 30 PPM, and may have a temperature drift of +/-20 PPM. Added to this may be another 50 PPM drift with age for a total tolerance of 100 PPM. Thus, the minimum voltage-tuning range of the VCXO, i.e., oscillator 22, must be 200 PPM (100 PPM for each oscillator). In reality, there will be considerable tracking with temperature and aging so a reasonable range might be 100 PPM. Given this tuning range, the system of FIG. 1 can be manufactured without any adjustment and yet achieve an initial pulse-echo ranging accuracy of better than 0.003% using low cost components.

Figure 4A:
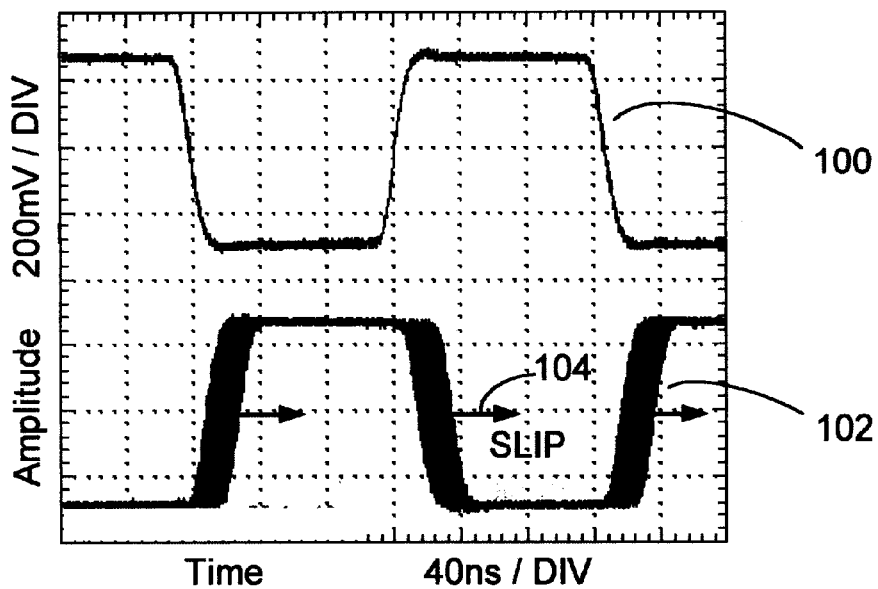
FIG. 4a is an oscillograph of 4 MHz TX and RX clock waveforms produced by an embodiment of the system of FIG. 3.

FIG. 4a is an oscillograph showing the phase slippage between the TX CLOCK signal on line 13, waveform 100, and the RX CLOCK signal on line 23, waveform 102. The oscilloscope was synchronized to the TX CLOCK signal and its bandwidth was limited to slow the rise and fall times for better viewing. The phase of the RX CLOCK signal slipped across about 36 degrees during this time-lapse plot, as indicated by arrows 104. At $\Delta$=25 Hz, the phase slips across 360 degrees every 40-milliseconds.

In a typical rangefinder system of FIG. 1, the transmitter will emit a pulse on each positive-going edge of the TX CLOCK signal 100 and the receiver will sample echoes on each positive-going edge of RX CLOCK signal 102, such that one complete cycle of the transmitter is sampled every 40-milliseconds. Over a span of 40 ms, 4 MHz*40 ms=160,000 samples are taken, and they are spread uniformly over the period of the 4 MHz TX CLOCK, or one sample every 250 ns/160000=1.65 picoseconds.

Figure 4B:
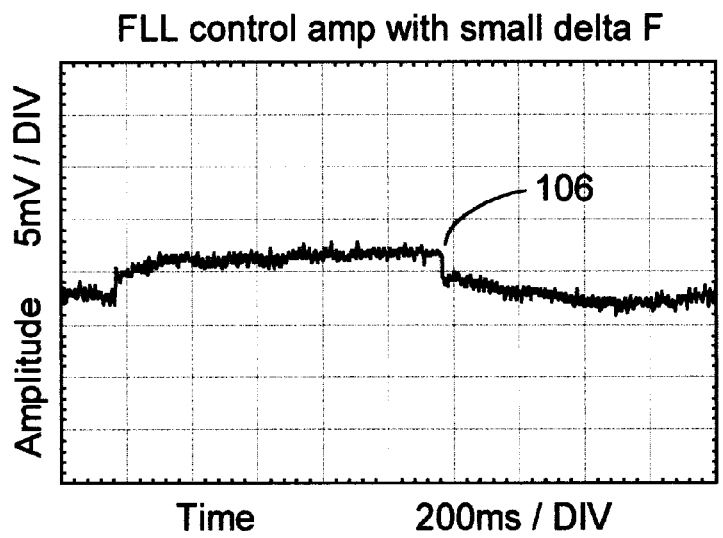
FIG. 4b is an oscillograph of the transient response of the FLL control amplifier in the control circuit of FIG. 3.

FIG. 4b indicates the dynamics of the FLL control amplifier 84 of FIG. 3. It is an oscillograph of the voltage applied to the VCXO control port 48 in response to a 0.1 Hz frequency step in $\Delta_{REF}$ at phase lock port 30. As can be seen, the transient response 106 is quite rapid.

Changes and modifications in the specifically described embodiments can be carried out without departing from the scope of the invention which is intended to be limited only by the scope of the appended claims.

What is claimed is:

1. A timing system for use in a pulsed electromagnetic transmitter-receiver system, comprising:

first and second oscillators, the first oscillator providing a transmit clock signal at a first oscillator frequency to the transmitter, the second oscillator providing to the receiver a receive clock signal having a frequency that differs by a small offset Δ from the first oscillator frequency, an offset frequency controller connected to the second oscillator and responsive to detected pulses from the receiver to lock the second oscillator frequency to the offset Δ from the first oscillator frequency.

2. The system of claim 1 wherein the frequency controller further comprises a wrong sideband detector for locking the second oscillator frequency to the correct sideband.

3. The system of claim 2 wherein the wrong sideband detector is an overvoltage detector.

4. The system of claim 1 wherein the frequency controller further comprises a phase lock port for locking the offset frequency to an external reference offset frequency.

5. The system of claim 1 wherein the second oscillator frequency is slightly lower than the first oscillator frequency.

6. The system of claim 1 wherein the second oscillator frequency is slightly higher than the first oscillator frequency.

7. The system of claim 1 further comprising a shield between the first oscillator, and the second oscillator and offset frequency controller.

8. The system of claim 1 wherein the first oscillator is physically removed from the second oscillator and offset frequency controller.

9. The system of claim 1 wherein the offset frequency controller comprises a sampling frequency lock loop (FLL).

10. The system of claim 1 wherein the offset frequency controller comprises:

an input line for inputting detected pulses from the receiver, an edge detector connected to the input line, a delay connected to the input line, a period-to-voltage converter having its reset input connected to the delay, a sampling switch connected to the output of the period-to-voltage converter and being controlled by the output of the edge detector, an integrator connected to the sampling switch and having an output connected to the second oscillator.

11. The system of claim 10 further comprising an overvoltage detector connected from the output of the integrator to a reset input of the integrator.

12. The system of claim 10 further comprising a reference offset frequency port connected to the period-to-voltage converter.

13. The system of claim 1 wherein the first and second oscillators comprise crystal oscillators.

14. An apparatus comprising:

an electromagnetic transmitter, an electromagnetic receiver, a timing system comprising:

first and second oscillators, the first oscillator providing a transmit clock signal at a first oscillator frequency to the transmitter, the second oscillator providing to the receiver a receive clock signal having a frequency that differs by a small offset Δ from the first oscillator frequency, an offset frequency controller connected to the second oscillator and responsive to detected pulses from the receiver to lock the second oscillator frequency to the offset Δ from the first oscillator frequency.

15. The apparatus of claim 14 wherein the transmitter and receiver comprise an impulse radar, TDR RF radar, a pulsed laser, a pulsed radio, or a TDR system.

16. A method for generating a swept clock delay in a pulsed electromagnetic transmitter-receiver system, comprising:

generating a first oscillation at a first oscillation frequency, the first oscillation being applied to the transmitter;

generating a second oscillation at a frequency that differs by a small offset frequency Δ from the first oscillation frequency, the second oscillation being applied to the receiver;

obtaining receive pulses from the receiver, controlling A with the receive pulses.

17. The method of claim 16 further comprising detecting when the second oscillation frequency is in a wrong sideband and resetting the second oscillation frequency to the correct sideband.

18. The method of claim 16 further comprising controlling Δ with a sampling frequency lock loop (FLL) to reduce phase slippage nonlinearities.

19. The method of claim 16 further comprising applying the first oscillation to a transmitter to drive a radar, laser, radio, or TDR system.

* * * * *